COMPUTER ORGANIZATION EMPLOYING PLURAL OPERAND STORAGE

Filed March 30, 1966 4 Sheets-Sheet 1

INVENTOR
W. KEISTER
BY Stephen B. Judlowe
ATTORNEY

COMPUTER ORGANIZATION EMPLOYING PLURAL OPERAND STORAGE

Filed March 30, 1966 4 Sheets-Sheet 3

COMPUTER ORGANIZATION EMPLOYING PLURAL OPERAND STORAGE

Filed March 30, 1966

4 Sheets-Sheet 4

United States Patent Office 3,409,879
Patented Nov. 5, 1968

3,409,879
COMPUTER ORGANIZATION EMPLOYING PLURAL OPERAND STORAGE

William Keister, Short Hills, N.J., assignor to Bell Telephone Laboratories, Incorporated, New York, N.Y., a corporation of New York Filed Mar. 30, 1966, Ser. No. 538,677
10 Claims. (Cl. 340—172.5)

ABSTRACT OF THE DISCLOSURE

A computing system is disclosed which includes a central processing unit connected to a program memory and two operand memories. The central processing unit, in turn, comprises two instruction location counters for respectively operating on the two operand memories in accordance with the contents of the program memory. That is, the central processing unit operates alternately in conjunction with each operand memory.

Figure 1:
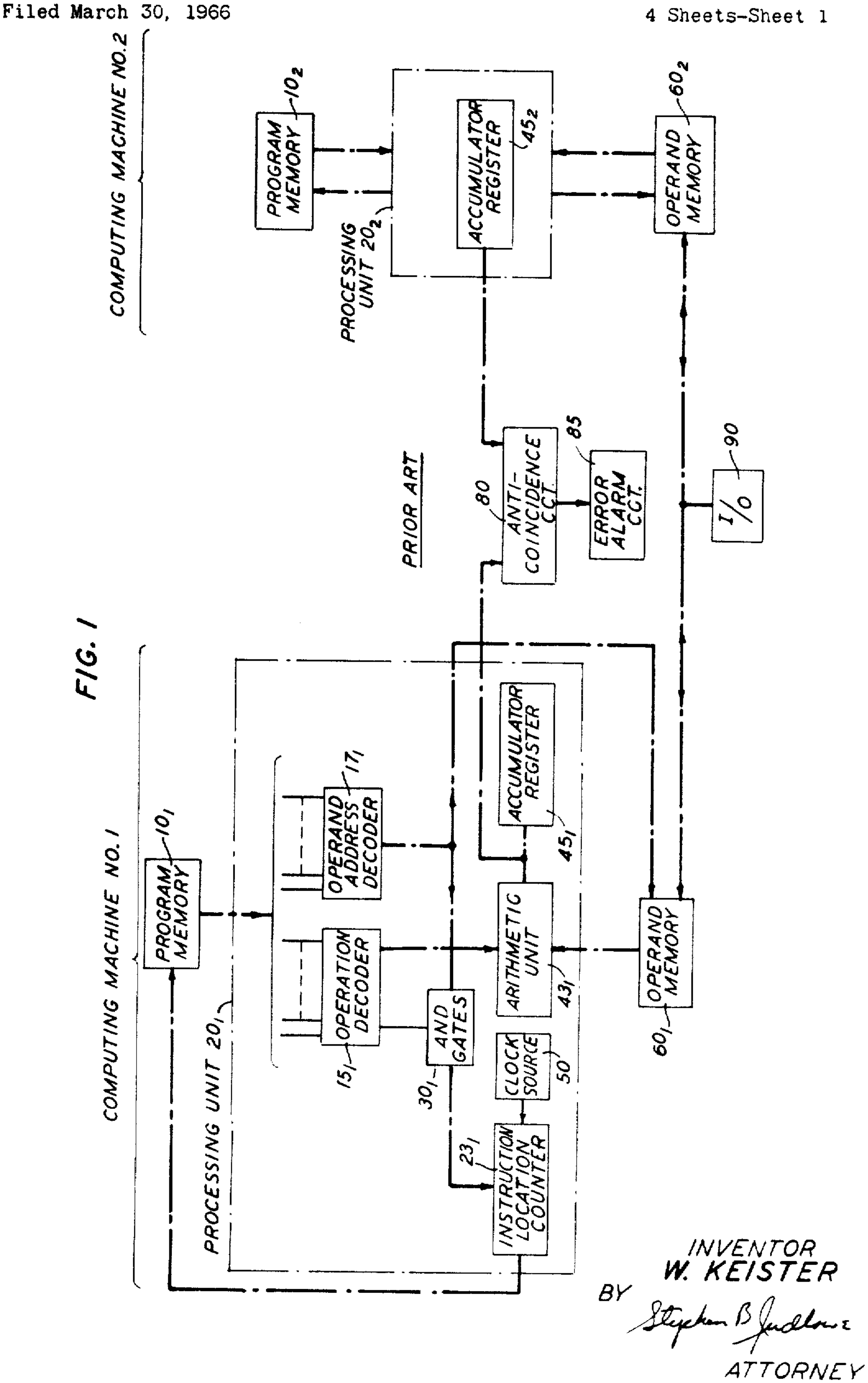

This invention relates to digital computers and, more specifically, to a computing arrangement which takes equipment hardware failures and also program software errors into account.

Stored program digital computers are being employed in an ever increasing scope on a real time basis to control an associated environment, e.g., in machine tool and telephone plant applications. Such computer installations are subject to two principal error-producing faults. First, equipment component failures cause the machines to operate in an unpredictable manner, and to thereby fail to regulate the associated environment in accordance with the stored program. In addition, program errors constrain the computer to operate in an unanticipated mode which deviates from the desired data processing sequencing.

Such programming errors, in turn, may be of two general types. There first exists the possibility of coding errors, i.e., the insertion of nondictionary instructions in the program store. Then also, there are latent program errors which are encountered only when unanticipated data combinations are supplied to the computer.

It is therefore an object of the present invention to provide a real time data processing organization which takes both hardware and software faults into account.

More specifically, an object of the present invention is the provision of a computing organization which continues to function when either hardware or software faults are encountered.

These and other objects of the present invention are realized in a specific illustrative real time digital computing organization for reducing the disruptive effect of coding and latent program errors in real time data processing systems. The arrangement comprises a data processing unit which includes two instruction location counters for respectively operating on two operand memories in accordance with the contents of a single program memory.

The work operands for the computing system are adapted to divide approximately equally between the two operand memories. Also, transfer instructions are spaced at convenient intervals in the stored program to automatically render the data processing unit operable in conjunction with each operand memory in an alternating relationship. When a program error is encountered, only the information stored in one operand memory need be lost (worst case), with the other memory remaining available to continue system functioning.

Moreover, two identical such computing system organizations may be connected in parallel, with the data flow at corresponding system data points being compared after each operation to account for hardware as well as software faults.

It is thus a feature of the present invention that a computer organization include a program memory, a program controlled data processing unit connectable with the program memory, two operand memories, and switching circuitry for automatically rendering the processing unit operable in conjunction with each of the operand memories.

It is another feature of the present invention that a real time computing organization include first and second computer structures; each of the computer structures including a program memory, a program controlled data processing unit connectable with the program memory, and two operand memories; switching circuitry for automatically rendering each of the processing units operable in conjunction with each operand memory associated therewith; and anticoincidence circuitry connected to like data points in the two data processing units.

Figure 2A:
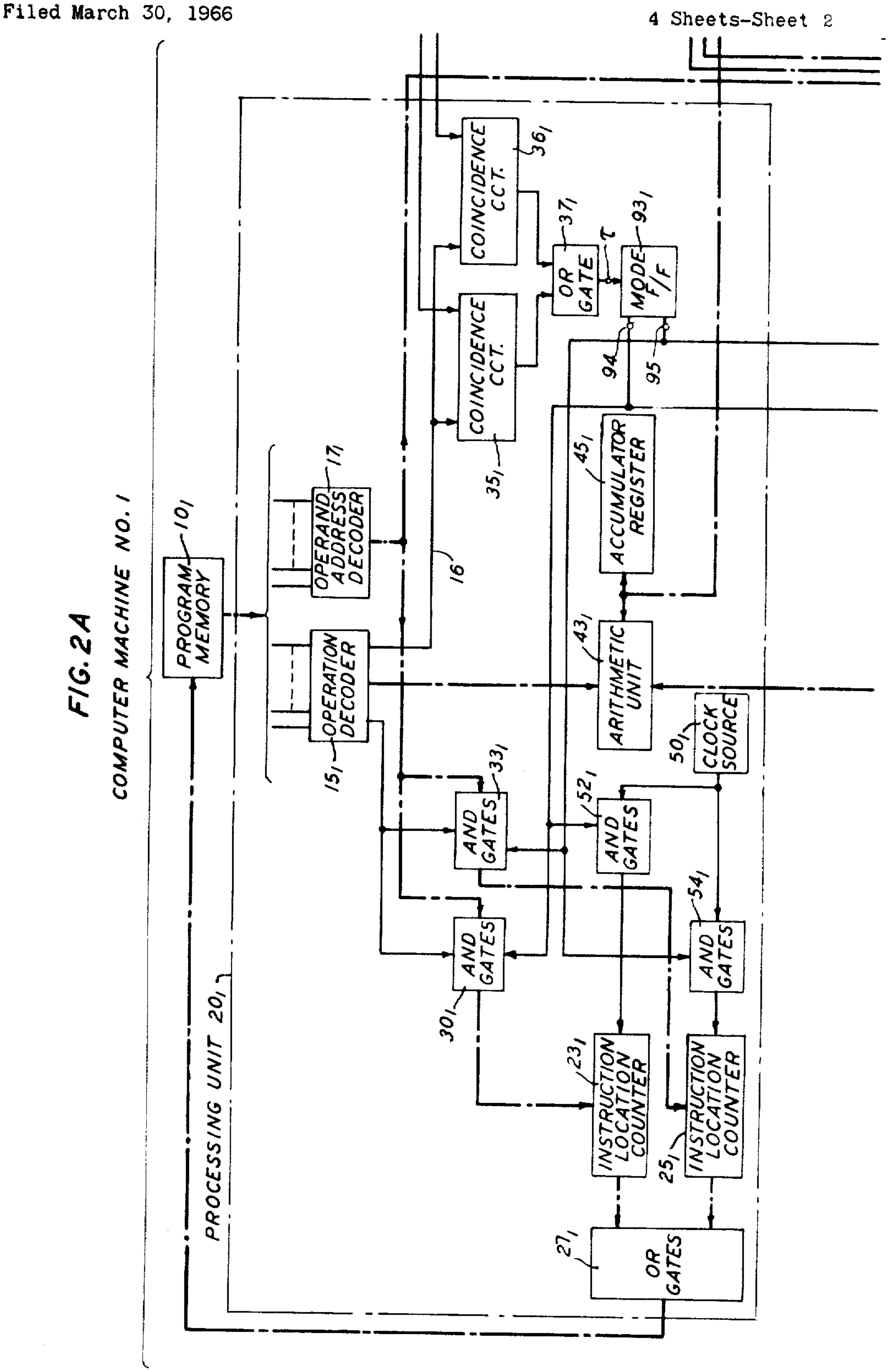
Figure 2B:
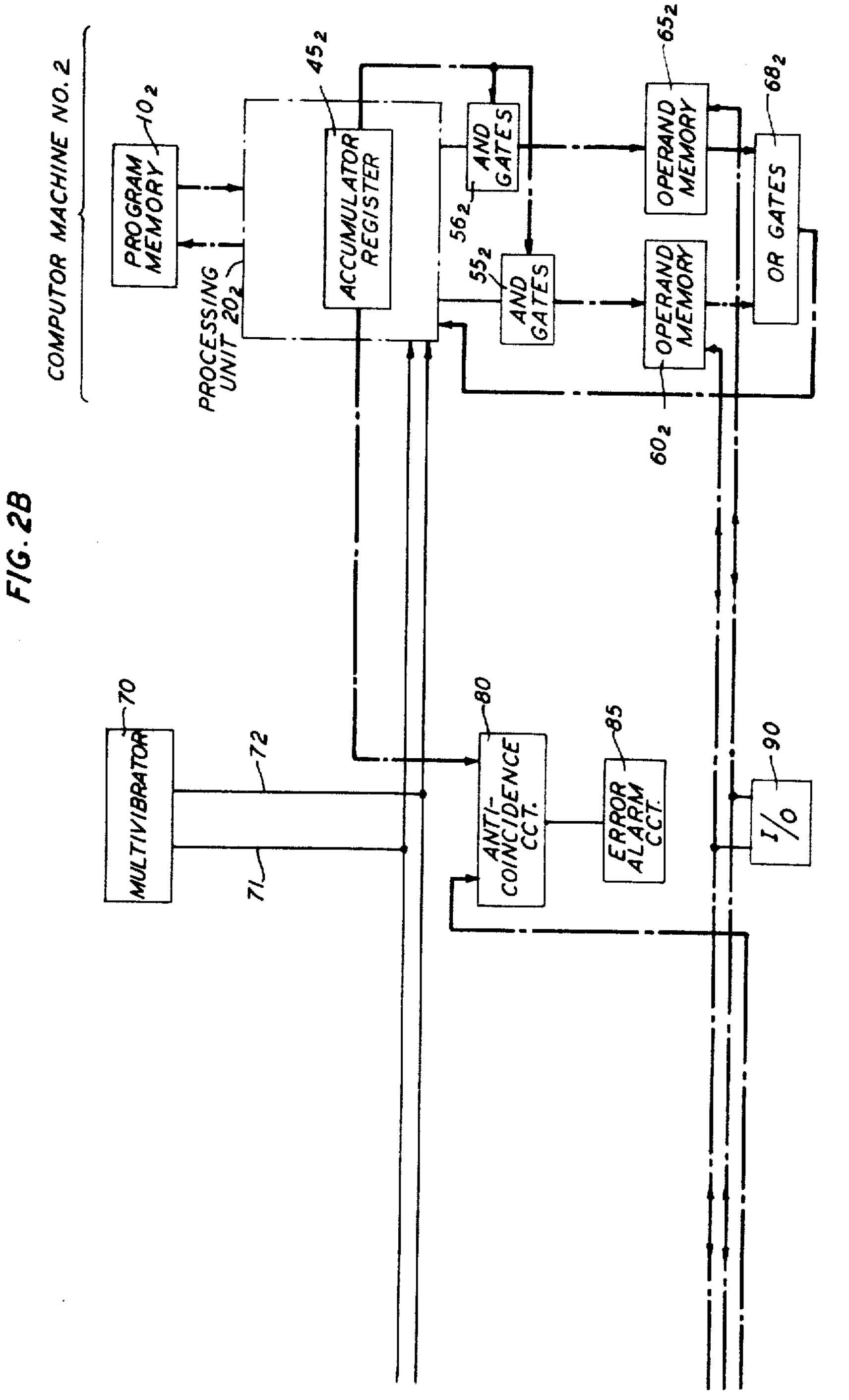
Figure 2C:
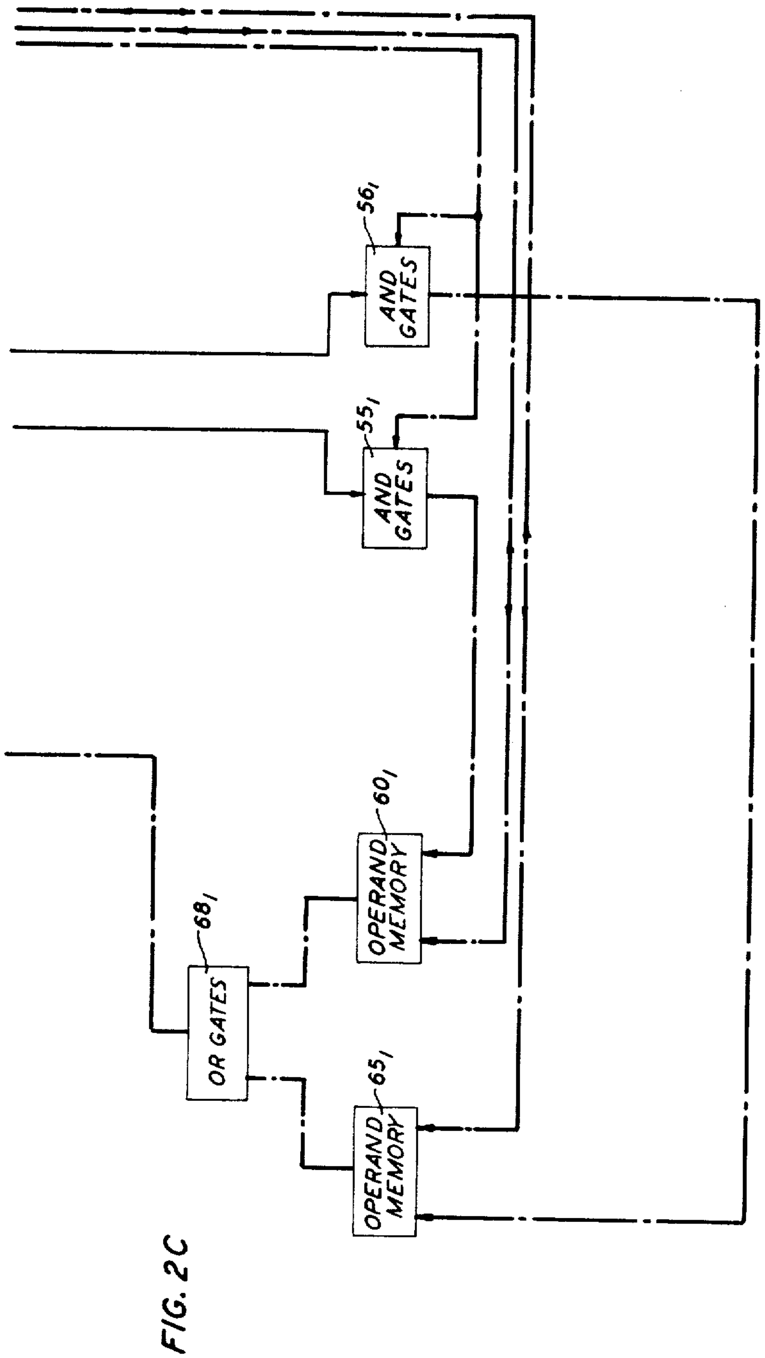
Figure 3:
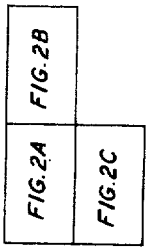

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 comprises a prior art computing organization;

FIGS. 2A, 2B and 2C comprise portions of a computing organization which embodies the principles of the present invention; and FIG. 3 illustrates the spacial organization of FIGS. 2A through 2C.

Throughout the drawing the same functional element, when shown in more than one figure, is designated by a like principle reference numeral.

Referring now to FIG. 1, there is shown a prior art real time digital computing arrangement adapted to energize an error alarm circuit 85 responsive to any single equipment hardware fault. The arrangement employs two computing machines, i.e., machines Nos. 1 and 2 each including a processing unit 20 for operating on operand (data) quantities stored in an operand memory 60 in accordance with a stored program contained in a program memory 10. Each processing unit 20 includes an instruction location counter 23 which is quiescently cycled by a clock source 50 for reading a sequence of program instructions out of the associated program memory 10. Each instruction so derived contains an operation code portion which is supplied to an operation decoder 15 and an address portion which is supplied to an operand address decoder 17. Except for instructions containing a transfer (branch) operation code, the address portion of each instruction identifies a particular storage location in the operand memory 60 which includes a particular operand quantity required for the operation specified by the associated operation code.

The operation codes processed by the decoder 15 can generally be categorized as comprising either an arithmetic or an instruction transfer operation. When an arithmetic operation code such as ADD, SUBTRACT, SHIFT, etc. is encountered, the decoder 15 causes an arithmetic unit 43 to effect the desired operation on a quantity supplied thereto by an accumulator register 45 and/or an operand read out from the memory 60 responsive to memory addressing signals generated by the address decoder 17.

Correspondingly, when an instruction branching, or transfer code is encountered, the unit 15 is adapted to enable a plurality of AND gates 30 to register the quantity decoded by the element 17 in the instructions location counter 23. The operand address quantity in this case comprises a storage location in the permanent program memory 10, such that the system instruction contained at this location will next be read out from the memory 10 by the instruction location counter 23 and executed by the composite computing machine.

An input/output unit 90 is employed to register identical operand quantities in the operand memories $60_1$ and $60_2$ respectively included in the machines 1 and 2, with these operands identifying physical quantities such as temperatures, voltages, sizes, etc. which describe the environment regulated by the overall FIG. 1 real time computing structure. In addition, the input/output unit 90 is adapted to control the related environment by suitably employing output control quantities stored in the operand memories 60. It is noted that all subscripts 1 or 2 employed herein or illustrated in the drawing identify a particular equipment item as being respectively included in the computing machine 1 or 2.

The program memories $10_1$ and $10_2$ included in the machines 1 and 2 are adapted to contain identical programs. Hence, since the machines and also the contents of the operand memories $60_1$ and $60_2$ are also identical, the machines 1 and 2 normally perform like operations, with like digital quantities being present at any time at corresponding data points therein. In this regard, an anticoincidence (e.g. Exclusive OR) circuit 80 is adapted to compare the contents of the two accumulator registers $45_1$ and $45_2$ after each operation. If the two machines are in proper working order, the resulting like contents of the two accumulator registers 45 do not enable the anticoincidence circuit 80. Conversely, when an equipment failure in either machine causes the accumulator contents to be dissimilar, the anticoincidence circuit 80 causes an alarm circuit 85 to produce an error indication. A computer operator responds to the error alarm by taking the faulty machine off-line and effecting the necessary repairs, while the properly functioning machine remains on-line to continue system functioning.

Thus, the prior art organization shown in FIG. 1 processes data in the above-described manner by sequentially executing stored instructions, and yields an alarm signal responsive to any hardware malfunction.

However, absent such an equipment fault, the machines 1 and 2 execute each and every instruction in a mutually identical manner, independent of the relative accuracy or propriety of the instructions. Thus, if a latent programming error were encountered which did not provide for a particular environmental situation, the two machines would function in an erroneous but identical manner, and the alarm circuit 85 would not be energized. Moreover, if the stored programming error was at all serious, it is likely that the entire contents of both of the operand memories $60_1$ and $60_2$ would be rendered useless. Accordingly, each machine 1 and 2 would have to be reset to a cleared initial state, to begin controlling the associated environment anew. In such an eventuality, not only are all the valuable stored operands lost, but the computing machine must begin its new mode of data processing in an unsatisfactory overloaded condition, since past, present and future operands are all simultaneously competing for processing service.

Referring now to FIGS. 2A, 2B, and 2C, hereinafter called composite FIG. 2, there is shown a real time computing organization made in accordance with the principles of the present invention for reducing the above-described disruptive system effects caused by program errors. The arrangement includes two computing machines Nos. 1 and 2 operable in conjunction with an anticoincidence circuit 80 and an error alarm circuit 85. The elements 80 and 85 function in the manner disclosed hereinabove to detect any single equipment failure by sensing a data disparity at corresponding data points in the two machines.

Each computing machine includes a processing unit 20 for operating on operand quantities stored on a mutually exclusive basis in two operand memories 60 and 65 by an input/output unit 90 in accordance with a stored program contained in a program memory 10. The processing unit 20 includes an operation decoder 15, an operand address decoder 17, an arithmetic unit 43, and an accumulator register 45 which are operative in conjunction with an instruction location counter 23 and an operand memory 60, or an instruction location counter 25 and an operand memory 65, to process data in the manner described hereinabove with respect to the prior art arrangement of FIG. 1.

More specifically, the input/output unit 90 is adapted to divide the environmental operands approximately equally between the two operand memories 60 and 65 associated with each machine. Switching circuitry, described hereinbelow, is employed in each FIG. 2 machine 1 and 2 to functionally connect in an alternating relationship the instruction location counter 23 and the operand memory 60, or the instruction location counter 25 and the operand memory 65 to the other components thereof such that operands respectively contained in the memories 60 and 65 are alternately processed in the manner described in detail above regarding the FIG. 1 organization.

The program memory 10 in each machine is adapted to contain mode transfer instructions at convenient locations therein, e.g., at the end of environmental controlling functional subroutines. In addition, a multivibrator 70 is utilized to alternately energize two control leads 71 and 72 connected thereto. When a change of state in the multivibrator 70 occurs in time coincidence with, or is followed by the incidence of a mode transfer instruction, each processing unit 20 is adapted to switch to the alternate instruction location counter 23 or 25 and operand memory 60 or 65 to initiate processing of the alternate set of stored operands.

To this end, a $\tau$-input, toggle mode flip-flop 93 is included in each machine and adapted to alternately supply a relatively high potential to two output terminals 94 and 95 thereon. When the terminal 94 is activated, plural AND gates 30 are partially enabled to selectively supply transfer program store addresses detected by the address decoder 17 to the instruction location counter 23 when the operation decoder 15 detects a transfer instruction operation code. Similarly, the activated terminal 94 functionally connects the clock source 50 to the instruction location counter 23 by way of a partially enabled AND gate 52, and renders the processing unit 20 operative in conjunction with the operand memory 60 via partially enabled plural AND gates 55. Plural OR gates 27 and 68 are respectively employed to connect the activated instruction location counter 23 or 25 to the program store 10, and to connect the operand memory 60 or 65 currently in use to the processing unit 20. Hence, it is observed that when the mode flip-flop output terminal 94 is energized, the FIG. 2 machines 1 and 2 are functionally identical to the corresponding prior art machines of FIG. 1, with the instruction location counter 23 and the operand memories 60 being utilized.

Correspondingly, when the mode of flip-flop 93 output terminal 95 is activated, the AND gates 33, 54 and 56 are partially enabled to render the FIG. 2 machines 1 and 2 operative utilizing the instruction location counters 25 and the operand memories 65.

The mode flip-flop 93 in each machine is cycled between its operative conditions by two coincidence (AND) circuits 35 and 36 and an OR gate 37. Each time the multivibrator 70 changes state, the lead 71 or 72 thus energized partially enables an associated one of the coincidence circuits 35 or 36. When the operation decoder 15 detects the incidence of the next mode transfer instruction, it pulses a control lead 16 thereby fully enabling the selected circuit 35 or 36. This latter circuit is then operative to pulse the $\tau$-input of the flip-flop 93 via the OR gate 37. Responsive thereto, the mode flip-flop 93 changes state, and energizes the previously inactive output terminal 94 or 95. Accordingly, the computing machines 1 and 2 are thus alternately operative in conjunction with the instruction location counters 23 or 25 and the operand memories 60 or 65, respectively.

To further illustrate the operation of the FIG. 2 computing arrangement, assume that the instruction location counters 23 and 25 in each machine contain the program memory 10 addresses 010100 and 000111. Further, assume that the multivibrator 70 has last energized the control lead 71 connected thereto and that the decoder 15 has just pulsed the lead 16 responsive to a detected mode transfer instruction, such that the mode flip-flop 93 is caused by the fully activated coincidence circuit 35 and the OR gate 37 to energize the output terminal 94 thereon.

With the FIG. 2 organization residing in such a state, each machine 1 and 2 is functionally operative utilizing the instruction location counter 23 and the operand memory 60. In particular, the clock source 50 included in each computing structure 1 and 2 cycles the associated instruction location counter 23 via the activated AND gate 52. The counter responds to each clock pulse by reading out an instruction identified by the counter 23 status from the associated program memory 10, with each such instruction being processed by the processing unit 20. In addition, the anticoincidence circuit 80 and the alarm circuit 85 are adapted to compare the contents of the accumulator registers $45_1$ and $45_2$ included in the two machines, and to register an error alarm if an equipment failure causes a variance in the compared quantities.

At some later time, the multivibrator 70 is constrained to change state and energizes the alternate control lead 72, such that the coincidence circuit 36 in each machine is partially enabled while the corresponding circuit 35 is disabled. At or following this instant, when the instruction location counter 23 causes a mode transfer instruction to be read out from the program memory 10, the coincidence circuit 36 is fully activated by the operation decoder 15 via the lead 16. Accordingly, the circuit 36 pulses the $\tau$-input of the mode flip-flop 93 by way of the OR gate 37, with the flip-flop output terminal 95 thus being energized and the terminal 94 being deenergized. Hence, the AND gates 33, 54 and 56 are enabled by the relatively high potential appearing at the associated mode flip-flop 93 terminal 95 to effectively connect the instruction location counters 25 and the operand memories 65 into the computing organization 1 and 2 such that the operands in the memories 65 are processed in accordance with the instructions beginning with the order word located at the program memory 10 addresses 000111 initially contained in the counters 25.

Similarly, when the instruction location counters 23 and the operand memories 60 are later again connected into the machines 1 and 2, operands in the memories 60 will be processed in accordance with the instruction contained in a program memory 10 location identified by the contents of the instruction location counter 23.

The computing machines 1 and 2 of FIG. 2 have thus been shown by the above to alternately process operands contained in the memories 60 and 65 associated therewith under the control of the multivibrator 70 and mode transfer instructions contained in program memories 10. Moreover, the anticoincidence circuit 80 and the error alarm circuit 85 are operative after each instruction is executed by the two machines for detecting any equipment failures.

The effect of errors in the stored program contained in the program memories 10 on the composite machines 1 and 2 of FIG. 2 will now be considered. If a serious program error is encountered by a machine processing unit 20, the contents of the associated operand memory then functionally connected to the processing unit, e.g., the operand memory 65, would be destroyed in the worst case. However, the machines 1 and 2 remain fully operative in conjunction with the instruction location counters 23 and the operand memories 60 to continue data processing without interruption with respect to both the past operands already contained in the memories 60 and also any new environmental operand quantities generated by the input/output unit 90. Hence, the system overload caused by a program error is either greatly reduced or eliminated, both because the machines remain continuously operative as aforesaid in conjunction with the instruction location counters 23 and the memories 60, and also since only approximately one-half of the operands, i.e., those included in the operand memories 65, were destroyed and therefore are in need of recomputation.

Thus, the composite FIG. 2 organization has been shown by the above to greatly reduce a disruptive effect of stored program errors in a real time computing system, and to also detect hardware failures therein.

It is to be understood that the above-described arrangement is only illustrative of the application of the principles of the present invention. Numerous other arrangements may be devised by those skilled in the art without departing from the spirit and scope thereof. For example, the program and operand memories associated with each computing machine in FIG. 2 may advantageously comprise portions of a single composite memory structure, with an address translating element being selectively connected to the access leads connected thereto. Also, each machine 1 and 2 may include a third operand store (or a third portion of a composite memory) which is continuously accessible to each processing unit 20 for supplying easily replaceable operands thereto.

What is claimed is:

1. In combination in a computer organization, a program memory, a program controlled data processing unit connectable with said program memory, two operand memories, means for supplying mutually exclusive operand quantities to said two operand memories, and switching means for alternately rendering said processing unit operable in conjunction with each of said operand memories in an alternating relationship.

2. A combination as in claim 1 wherein said data processing unit includes two instruction location counters and regulating means controlled by said switching means for alternately rendering said processing unit operable in conjunction with said two operand memories.

3. A combination as in claim 2 wherein said program memory includes special mode transfer instructions, wherein said switching means includes a multivibrator, and wherein said regulating means includes a mode flip-flop, detector means for sensing said special mode transfer instructions stored in said program memory, and logic circuit means responsive to signals supplied thereto by said multivibrator and said detector means for changing the operative state of said flip-flop.

4. In combination, first and second computing means; each of said computing means comprising a program memory, a program controlled data processing unit connectable with said program memory, and two operand memories; switching means for rendering each of said processing units operable in conjunction with each operand memory associated therewith in an alternating relationship; input/output means for registering mutually exclusive operand quantities in corresponding operand memories included in said first and second computing means; and anticoincidence means connected to like data points in said two central processing units.

5. A combination as in claim 4 wherein each of said data processing units includes two instruction location counters and regulating means controlled by said switching means for alternately rendering said processing units operable in conjunction with said two operand memories associated therewith.

6. A combination as in claim 5 wherein said program memories include special mode transfer instructions, wherein said switching means includes a multivibrator, and wherein each of said regulating means includes a mode flip-flop, detector means for sensing said special mode transfer instructions stored in the associated program memory, and logic circuit means responsive to signals supplied thereto by said multivibrator and by the associated detecting means for changing the operative state of the associated mode flip-flop.

7. In combination, memory means including program and two operand storage portions, said program storage portion including a plurality of spaced mode transfer instructions, a data processing unit connected to said memory means, control means included in said processing unit for rendering said processing unit operative in accordance with a sequence of instructions stored in the program portion of said memory means to process operand quantities stored in a selected one of said two operand portions of said memory means, and additional control means responsive to detecting one of said mode transfer instructions for causing said control means to select the alternate operand storage portion of said memory means.

8. A combination as in claim 7 wherein said control means includes two instruction location counters.

9. A combination as in claim 8 wherein said additional control means comprises a flip-flop and means responsive to the incidence of one of said mode transfer instructions for changing the state of said flip-flop.

10. A combination as in claim 9 wherein said additional control means further comprises a source of binary control signals and logic means responsive to the incidence of one of said mode transfer signals and to a selected binary control signal character for changing the state of said flip-flop.

References Cited

UNITED STATES PATENTS

| | | | |
|---|---|---|---|
| 3,252,149 | 5/1966 | Weida et al. ------ | 340—172.5 |
| 3,303,474 | 2/1967 | Moore et al. ------ | 340—172.5 |
| 3,303,476 | 2/1967 | Moyer et al. ------ | 340—172.5 |

PAUL J. HENON, *Primary Examiner.*

RAULFE B. ZACHE, *Assistant Examiner.*